(12) United States Patent
Muranishi

(10) Patent No.: US 12,269,099 B2
(45) Date of Patent: Apr. 8, 2025

(54) CUTTING INSERT, CUTTING TOOL, AND METHOD FOR MANUFACTURING MACHINED PRODUCT

(71) Applicant: KYOCERA CORPORATION, Kyoto (JP)

(72) Inventor: Toru Muranishi, Moriyama (JP)

(73) Assignee: KYOCERA CORPORATION, Kyoto (JP)

( * ) Notice: Subject to any disclaimer, the term of this patent is extended or adjusted under 35 U.S.C. 154(b) by 682 days.

(21) Appl. No.: 17/439,387

(22) PCT Filed: Mar. 6, 2020

(86) PCT No.: PCT/JP2020/009654
§ 371 (c)(1),
(2) Date: Sep. 14, 2021

(87) PCT Pub. No.: WO2020/189336
PCT Pub. Date: Sep. 24, 2020

(65) Prior Publication Data
US 2022/0152707 A1    May 19, 2022

(30) Foreign Application Priority Data
Mar. 15, 2019  (JP) .................... 2019-047871

(51) Int. Cl.
*B23B 27/16*     (2006.01)
*B23B 1/00*      (2006.01)

(52) U.S. Cl.
CPC ............ *B23B 27/16* (2013.01); *B23B 1/00* (2013.01); *B23B 2200/088* (2013.01); *B23B 2200/165* (2013.01); *B23B 2205/12* (2013.01)

(58) Field of Classification Search
CPC .......... B23B 27/1666; B23B 2200/165; B23B 2200/088; B23B 2200/086; B23B 27/04; B23B 27/164; B23B 27/1625
See application file for complete search history.

(56) References Cited

U.S. PATENT DOCUMENTS

| 9,492,873 | B2 * | 11/2016 | Bhagath | ................ B23B 27/08 |
| 9,517,509 | B2 * | 12/2016 | Inoue | .................... B23B 29/043 |
| 2009/0285645 | A1 * | 11/2009 | Hecht | .................... B23B 27/04 407/107 |

FOREIGN PATENT DOCUMENTS

JP    2011520630 A    7/2011

* cited by examiner

*Primary Examiner* — Alan Snyder
*Assistant Examiner* — Reinaldo A Del Vargas Rio
(74) *Attorney, Agent, or Firm* — HAUPTMAN HAM, LLP

(57) ABSTRACT

A cutting insert may include an upper surface, a lower surface, a front lateral surface and a rear lateral surface. The upper surface may include an upper constraining surface. The lower surface may include a lower groove having a V-shape. The lower groove may include a first region, a second region, a third region a first portion and a second portion. A length of a line segment connecting the first portion and the second portion in the first region may be a first length, a length of a line segment connecting the first portion and the second portion in the second region may be a second length, and a length of a line segment connecting the first portion and the second portion in the third region may be a third length. The first length may be larger than each of the second length and the third length.

13 Claims, 10 Drawing Sheets

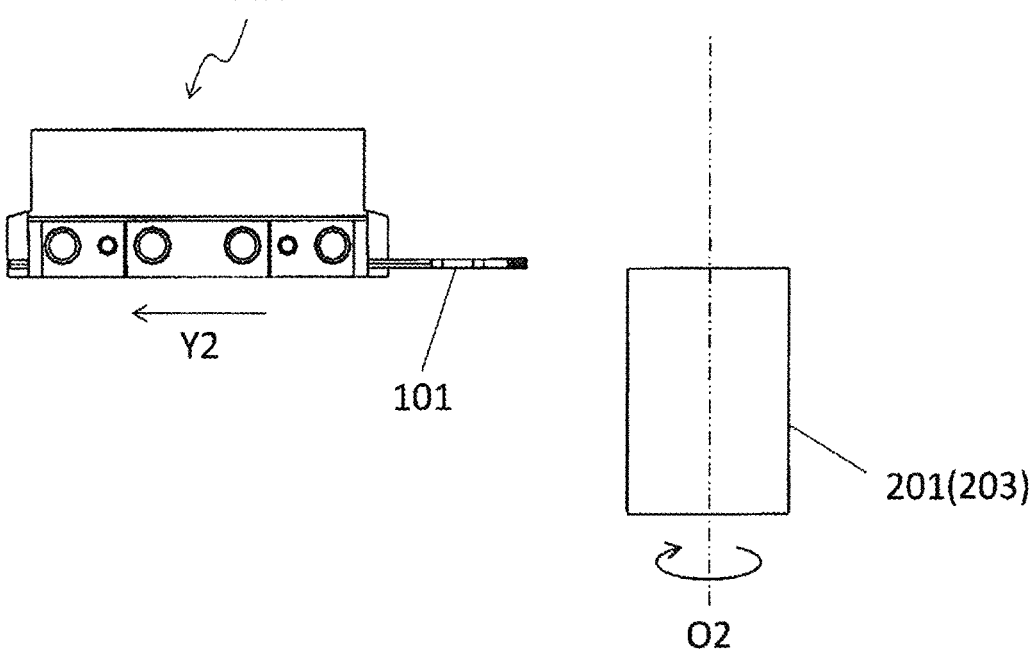

CUTTING INSERT, CUTTING TOOL, AND METHOD FOR MANUFACTURING MACHINED PRODUCT

CROSS-REFERENCE TO RELATED APPLICATION

This application is a national stage entry according to 35 U.S.C. 371 of PCT Application No. PCT/JP2020/009654 filed on Mar. 6, 2020, which claims priority to Japanese Patent Application No. 2019-047871, filed Mar. 15, 2019, which is entirely incorporated herein by reference.

TECHNICAL FIELD

The present disclosure may relate to a cutting insert for use in a cutting process. Specifically, the present disclosure may relate to a cutting insert for use in a turning process, such as a grooving process.

BACKGROUND

For example, a cutting tip is discussed in Japanese Unexamined Patent Application Publication No. 2011-520630 (Patent Document 1) as a cutting insert for use in a turning process of a workpiece, such as metal. The cutting tip (cutting insert) discussed in Patent Document 1 may include an upper surface, a lower surface and a peripheral lateral surface. The peripheral lateral surface may include a front end surface and a rear end surface. The lower surface may include a constraining surface in the shape of a V-shaped groove extended along a central axis (vertical axis). The constraining surface may include a first surface component located on a side of the front end surface, and a second surface component located on a side of the rear end surface. A wedge angle in the second surface component may be smaller than a wedge angle in the first surface component.

The cutting insert including the constraining surface in the shape of the V-shaped groove might suffer from deterioration in durability. For example, in cases where a cutting process is carried out using the cutting insert discussed in Patent Document 1, cutting load due to a principal force in the cutting process may also tend to be transmitted to the second surface component because the second surface component is located on the side of the rear end surface. The durability of the cutting insert may be lowered in the second surface component because the wedge angle in the second surface component is relatively small.

SUMMARY

A cutting insert in a non-limiting aspect of the present disclosure may include an upper surface, a lower surface, a front lateral surface and a rear lateral surface. The lower surface may be located on a side opposite to the upper surface. The front lateral surface may be located between the upper surface and the lower surface. The rear lateral surface may be located between the upper surface and the lower surface, and may be located on a side opposite to the front lateral surface. The upper surface may include a first upper cutting edge and an upper constraining surface. The first upper cutting edge may be located on an intersection with the front lateral surface. The upper constraining surface may be located closer to the rear lateral surface than the first upper cutting edge, and may be contactable with a holder. The lower surface may include a lower constraining surface contactable with the holder. The lower constraining surface may include a lower groove having a V-shape extended from a side of the front lateral surface toward the rear lateral surface.

The lower groove may include a first region, a second region and a third region. The first region may be located on a side opposite to the upper constraining surface. The second region may be located closer to the front lateral surface than the first region. The third region may be located closer to the rear lateral surface than the first region. The lower groove may further include a first portion and a second portion which are contactable with the holder. The first portion and the second portion may be opposed to each other with a bottom of the lower groove interposed therebetween. A length of a line segment connecting the first portion and the second portion in the first region may be a first length, a length of a line segment connecting the first portion and the second portion in the second region may be a second length, and a length of a line segment connecting the first portion and the second portion in the third region may be a third length in a cross section orthogonal to an extending direction of the lower groove. The first length may be larger than each of the second length and the third length.

BRIEF DESCRIPTION OF THE DRAWINGS

FIG. 16 is a schematic diagram illustrating one of the steps in the method for manufacturing a machined product in the non-limiting embodiment of the present disclosure.

EMBODIMENTS

<Cutting Inserts>

Figure 1:
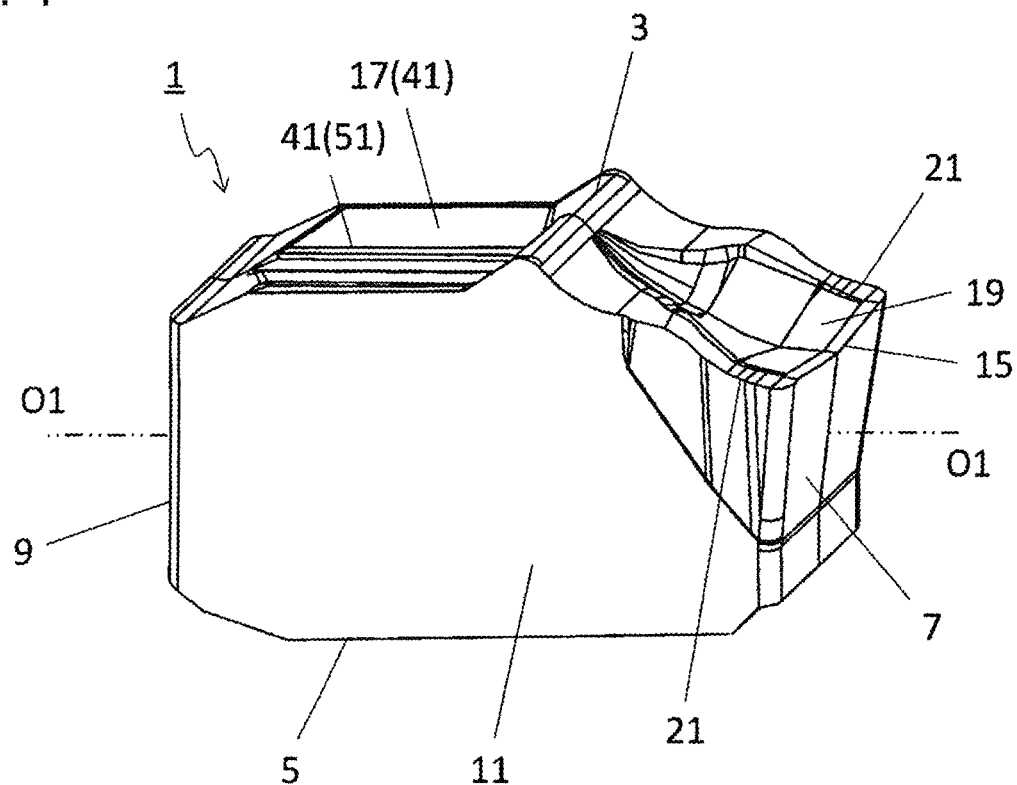
FIG. 1 is a perspective view illustrating a cutting insert in a non-limiting embodiment of the present disclosure.

Cutting inserts 1 (hereinafter also referred to simply as "inserts 1") in non-limiting embodiments of the present disclosure may be described in detail below with reference to the drawings. For the sake of description, the drawings referred to in the following may illustrate, in simplified form, only main members necessary for describing the embodiments. The cutting inserts 1 may therefore be capable of including any arbitrary structural member not illustrated in the drawings referred to. Dimensions of the members in each of the drawings may faithfully represent neither dimensions of actual structural members nor dimensional ratios of these members.

The insert 1 may include an upper surface 3, a lower surface 5, a front lateral surface 7 and a rear lateral surface 9. The lower surface 5 may be located on a side opposite to the upper surface 3. The front lateral surface 7 and the rear lateral surface 9 may be individually located between the upper surface 3 and the lower surface 5. The rear lateral surface 9 may be located on a side opposite to the front lateral surface 7. The front lateral surface 7 and the rear lateral surface 9 may individually connect to the upper surface 3 and the lower surface 5.

As used herein, the terms "the upper surface 3" and "the lower surface 5" may be used for the sake of convenience, and may not indicate directions of upper and lower. For example, the upper surface 3 may need not to be directed upward. Similarly, the terms "the front lateral surface 7" and "the rear lateral surface 9" may be used for the sake of convenience, and may not indicate directions of front and rear. These points may also be true for other parts including terms of upper, lower, front and rear.

In addition to the surfaces described above, the insert 1 may include a first lateral surface 11 and a second lateral surface 13. The first lateral surface 11 and the second lateral surface 13 may be located between the upper surface 3 and the lower surface 5 and between the front lateral surface 7 and the rear lateral surface 9. The first lateral surface 11 and the second lateral surface 13 may individually connect to the upper surface 3, the lower surface 5, the front lateral surface 7 and the rear lateral surface 9.

The insert 1 may have a quadrangular prism shape including the upper surface 3, the lower surface 5, the front lateral surface 7, the rear lateral surface 9, the first lateral surface 11 and the second lateral surface 13 as in the non-limiting embodiment illustrated in FIG. 1. The insert 1 may have a prism shape extended along a central axis O1 from a front end to a rear end as in a non-limiting embodiment illustrated in FIG. 1. The central axis O1 may be an axis passing through a center of the front lateral surface 7 and a center of the rear lateral surface 9.

The front lateral surface 7 may be located at the front end, and the rear lateral surface 9 may be located at the rear end. As in the non-limiting embodiment illustrated in FIG. 1, the front lateral surface 7 and the rear lateral surface 9 may have a quadrangular shape, and the four surfaces of the upper surface 3, the lower surface 5, the first lateral surface 11 and the second lateral surface 13 may be individually extended from the front lateral surface 7 toward the rear lateral surface 9.

Each of the upper surface 3, the lower surface 5, the front lateral surface 7, the rear lateral surface 9, the first lateral surface 11 and the second lateral surface 13 is not limited to specific dimensions. For example, a length of the upper surface 3 in a direction along the central axis O1 in a front view (top view) of the upper surface 3 may be set to approximately 3-50 mm. A length of the upper surface 3 in a direction orthogonal to the central axis O1 in a top view may be set to approximately 1.5-15 mm. A height of the insert 1 indicated by a distance between the upper surface 3 and the lower surface 5 may be set to approximately 2-20 mm.

The upper surface 3 may include a first upper cutting edge 15 and an upper constraining surface 17. The first upper cutting edge 15 may be located on an intersection with the front lateral surface 7 on the upper surface 3. The first upper cutting edge 15 may be located all over the intersection of the upper surface 3 and the front lateral surface 7, or may be located only at a part of the intersection of the upper surface 3 and the front lateral surface 7. The first upper cutting edge 15 may be used for cutting out a workpiece. The first upper cutting edge 15 in the non-limiting embodiment illustrated in FIG. 1 may be generally called a front cutting edge or main cutting edge.

The upper constraining surface 17 may be located closer to the rear lateral surface 9 than the first upper cutting edge 15. The upper constraining surface 17 may be contactable (touchable) with a holder when the insert 1 is attached to the holder. The upper constraining surface 17 may include an end part on a side of the rear end on the upper surface 3, namely, an intersection with the rear lateral surface 9, or may be located away from the intersection.

The upper surface 3 may include a rake surface 19 located along the first upper cutting edge 15. The rake surface 19 may connect to the upper constraining surface 17, or may be located away from the upper constraining surface 17. The upper surface 3 may further include, as a cutting edge, a second upper cutting edge 21 in addition to the first upper cutting edge 15.

The second upper cutting edge 21 may be located on an intersection with the first lateral surface 11 on the upper surface 3, or an intersection with the second lateral surface 13 on the upper surface 3. For example, the second upper cutting edge 21 may be located on an intersection with the first lateral surface 11 on the upper surface 3, and on an intersection with the second lateral surface 13 on the upper surface 3 as in the non-limiting embodiment illustrated in FIG. 1.

The lower surface 5 may include a lower constraining surface 23. The lower constraining surface 23 may be located all over the lower surface 5 or only a part of the lower surface 5. The lower constraining surface 23 may be contactable (touchable) with the holder when the insert 1 is attached to the holder. The insert 1 can be held by the holder by bringing the lower constraining surface 23 and the upper constraining surface 17 into contact with the holder.

The lower constraining surface 23 may include a lower groove 25 extended from a region located near the front lateral surface 7 toward the rear lateral surface 9. The lower groove 25 may open into the front lateral surface 7 or may be located away from the front lateral surface 7. Similarly, the lower groove 25 may open into the rear lateral surface 9 or may be located away from the rear lateral surface 9. The lower groove 25 may be located away from the front lateral surface 7 and the rear lateral surface 9 as in a non-limiting embodiment illustrated in FIG. 3.

Figure 3:
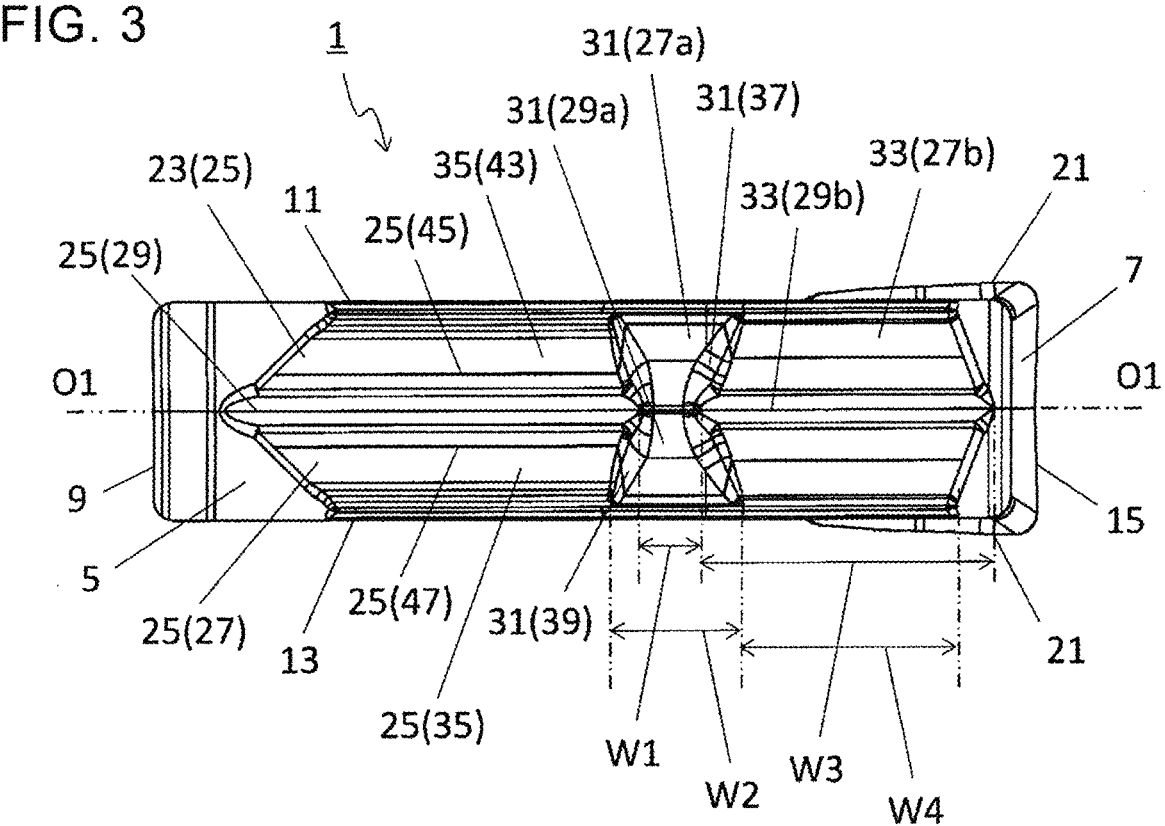
FIG. 3 is a plan view of the cutting insert illustrated in FIG. 1 as viewed from a side of a lower surface.
Figure 4:
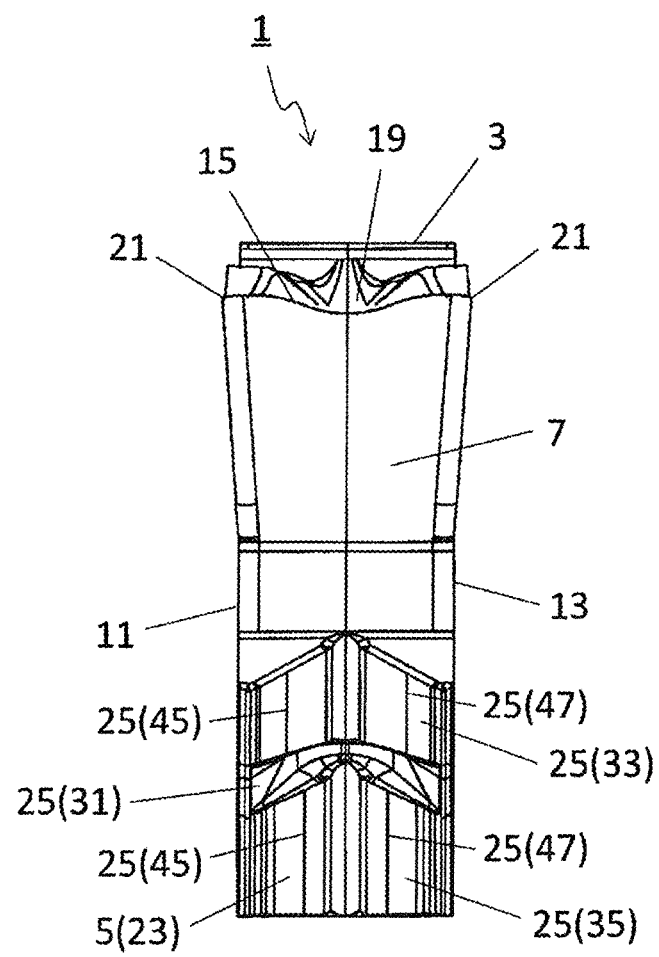
FIG. 4 is a plan view of the cutting insert illustrated in FIG. 2 as viewed from a side of a front lateral surface.
Figure 5:
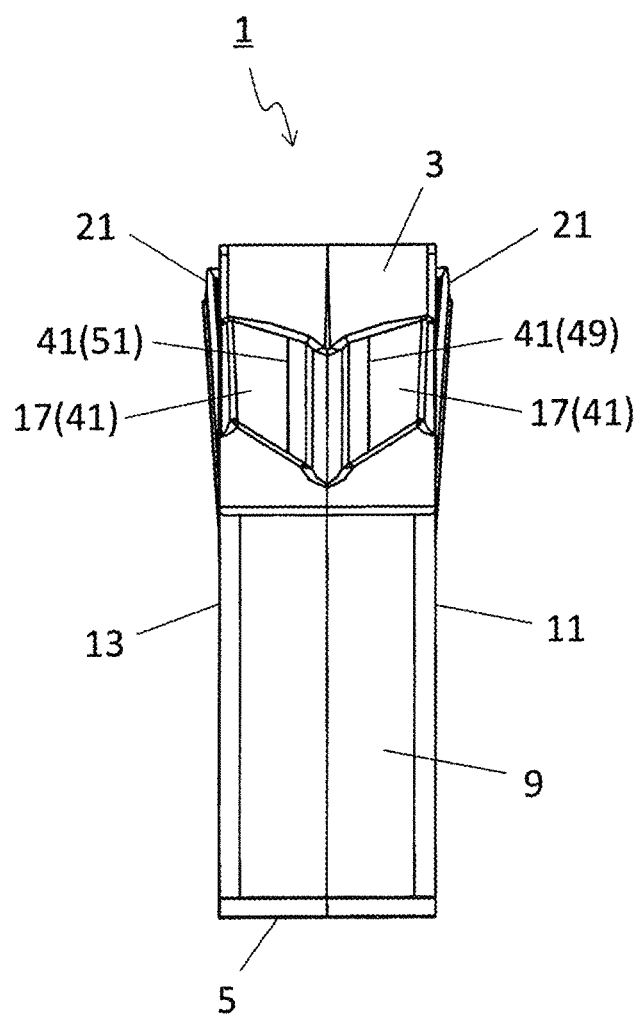
FIG. 5 is a plan view of the cutting insert illustrated in FIG. 2 as viewed from a side of a rear lateral surface.
Figure 6:
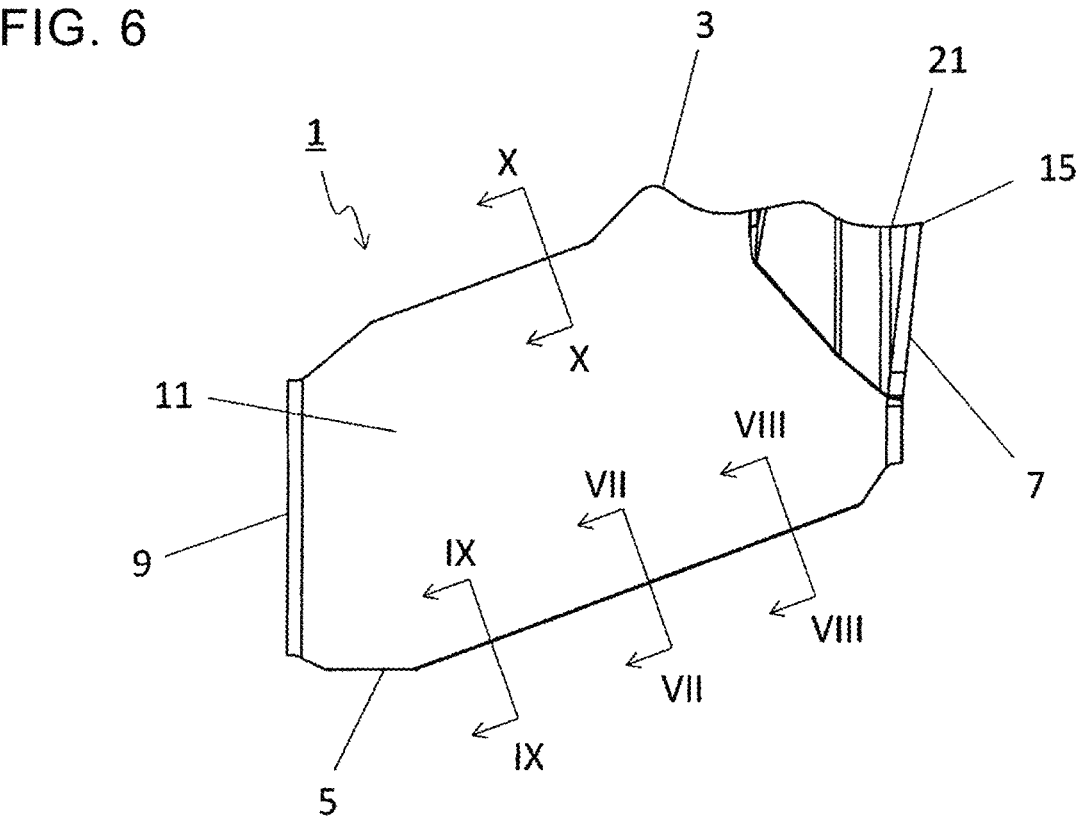
FIG. 6 is a side view of the cutting insert illustrated in FIG. 2 as viewed from an A1 direction.

In other words, the lower groove 25 may be extended parallel to the central axis O1 because the lower groove 25 is extended from a side of the front lateral surface 7 toward a side of the rear lateral surface 9 in the non-limiting embodiment illustrated in FIG. 3. The lower groove 25 may have a V-shape in a cross section orthogonal to an extending direction thereof, namely, a cross section orthogonal to the central axis O1.

Figure 7:
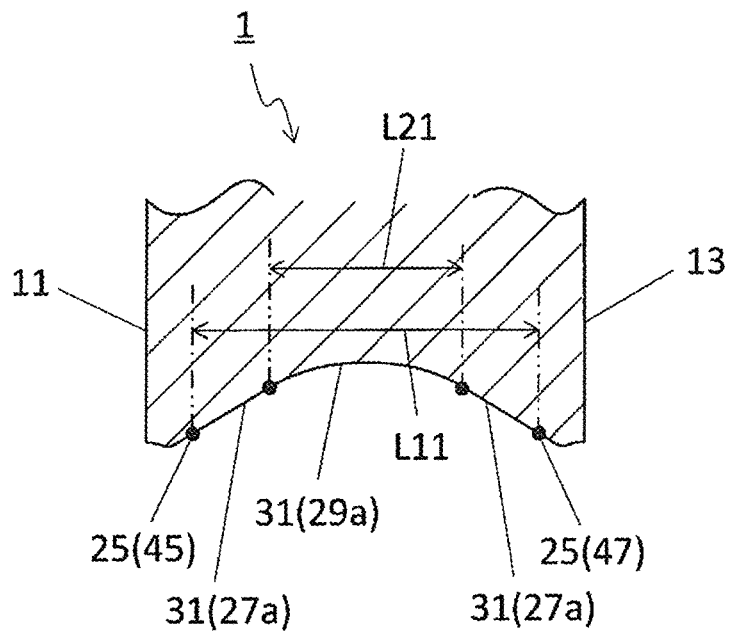
FIG. 7 is a cross-sectional view taken along the line VII-VII in the cutting insert illustrated in FIG. 6.
Figure 8:
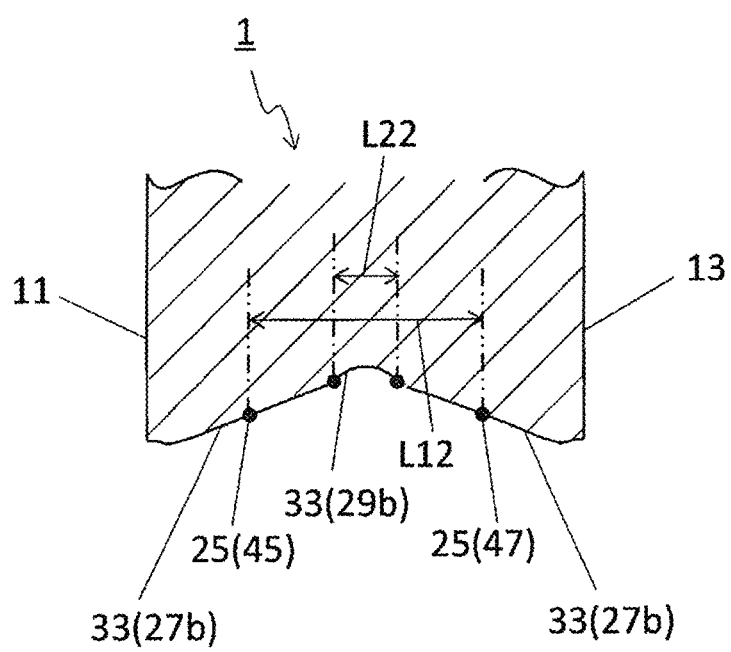
FIG. 8 is a cross-sectional view taken along the line VIII-VIII in the cutting insert illustrated in FIG. 6.
Figure 9:
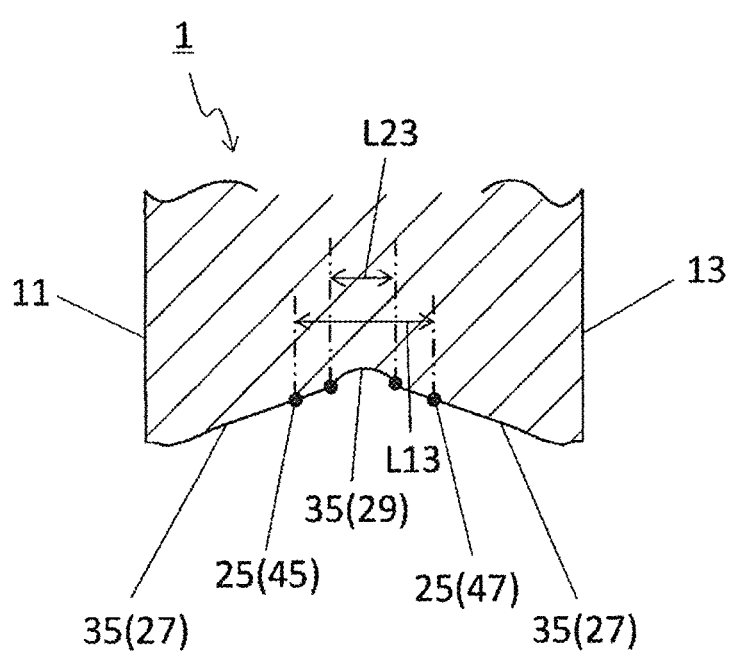
FIG. 9 is a cross-sectional view taken along the line IX-IX in the cutting insert illustrated in FIG. 6.

As used herein, the phrase that the lower groove 25 has the V-shape may denote that the lower groove 25 includes a pair of inclined surfaces 27 having a larger distance therebetween as going away from a bottom of the lower groove 25. Therefore, for example, a concave curved surface 29 to connect the pair of inclined surfaces 27 may be located on the bottom of the lower groove 25. The pair of inclined surfaces 27 may have a straight line shape in a cross-sectional view as in a non-limiting embodiment illustrated in FIGS. 7 to 9.

The lower groove 25 may include a first region 31, a second region 33 and a third region 35. The first region 31 may be located on a side opposite to the upper constraining surface 17. The second region 33 may be located closer to the front lateral surface 7 than the first region 31. The second region 33 may include an end part of the lower groove 25 which is located on a side of the front lateral surface 7, or may be located away from the front lateral surface 7. The third region 35 may be located closer to the rear lateral surface 9 than the first region 31. The third region 35 may include an end part of the lower groove 25 which is located on a side of the rear lateral surface 9, or may be located away from the rear lateral surface 9. The first region 31, the second region 33 and the third region 35 may have a V-shape.

The lower groove 25 may further include a first portion 45 and a second portion 47 which are contactable with the holder. The first portion 45 and the second portion 47 may be opposed to each other with a bottom of the lower groove 25 interposed therebetween. The first portion 45 and the second portion 47 can be brought into line contact with the holder when the insert 1 is attached to the holder. The first portion 45 and the second portion 47 may be individually continuously or discontinuously extended from a region located near the front lateral surface 7 toward the rear lateral surface 9.

A comparison may be made of shapes of the first region 31, the second region 33 and the third region 35 in a cross section orthogonal to an extending direction of the lower groove 25, namely, the cross section orthogonal to the central axis O1. Specifically, a length of a line segment connecting the first portion 45 and the second portion 47 in the first region 31 may be a first length L11, a length of a line segment connecting the first portion 45 and the second portion 47 in the second region 33 may be a second length L12, and a length of a line segment connecting the first portion 45 and the second portion 47 in the third region 35 may be a third length L13 in a cross section orthogonal to the extending direction of the lower groove 25.

The first length L11 may be larger than each of the second length L12 and the third length L13. This may lead to enhanced durability of the insert 1. It may be easy to ensure a large height between a bottom of the lower groove 25 in the first region 31 and each of the first portion 45 and the second portion 47 because the first length L11 is relatively large. The insert 1 may therefore be less susceptible to positional deviation in a direction orthogonal to the central axis O1 in a top view.

Additionally, because the second length L12 and the third length L13 are relatively small, principal force exerted on the insert 1 in the cutting process may tend to be received by the second region 33 located on a side of the front lateral surface 7 and by the third region 35 located on the side of the rear lateral surface 9. Because the principal force tends to be received by the second region 33 and the third region 35, the principal force may be less likely to be exerted on the first region 31 located between these regions. The insert 1 may therefore have enhanced durability.

The first length L11, the second length L12 and the third length L13 are not limited to a specific value. The first length L11 may be set to, for example, 1-12 mm. The second length L12 may be set to, for example, 0.25-2.5 mm. The third length L13 may be set to, for example, 0.25-2.5 mm.

The first length L11, the second length L12 and the third length L13 may be individually kept constant or changed. For example, the first length L11 may be changed, and the second length L12 and the third length L13 may be kept constant. Specifically, the first region 31 may include a first part 37 which is located on a side of the front lateral surface 7 and whose length (the first length L11) of the line segment connecting the first portion 45 and the second portion 47 increases as coming closer to the rear lateral surface 9, and a second part 39 which is located on a side of the rear lateral surface 9 and whose length (the first length L11) of the line segment connecting the first portion 45 and the second portion 47 increases as coming closer to the front lateral surface 7. The first part 37 may be located closer to the front lateral surface 7 than a midportion of the first region 31 in the extending direction of the lower groove 25. The second part 39 may be located closer to the rear lateral surface 9 than the midportion of the first region 31 in the extending direction of the lower groove 25. A part, which is located between the first part 37 and the second part 39 and includes the midportion of the first region 31, may have a constant length (the first length L11) of the line segment connecting the first portion 45 and the second portion 47.

If the first region 31 includes the first part 37, it may be easy to avoid that the length of the line segment connecting the first portion 45 and the second portion 47 changes sharply at a boundary between the first region 31 and the second region 33. If the first region 31 includes the second part 39, it may be easy to avoid that the length of the line segment connecting the first portion 45 and the second portion 47 changes sharply at a boundary between the first region 31 and the third region 35. The insert 1 may therefore have further enhanced durability.

If the second length L12 is kept constant, the principal force may further tend to be received by the second region 33. Similarly, if the third length L13 is kept constant, the principal force may further tend to be received by the third region 35.

If the first length L11, the second length L12 and the third length L13 are changed, their respective maximum values may be compared with one another.

The second length L12 may be identical with or different from the third length L13. The second length L12 may be larger than the third length L13 as in a non-limiting embodiment illustrated in FIGS. 8 and 9. The second region 33 may be located closer to the front lateral surface 7 than the first region 31 and the third region 35. Specifically, the second region 33 may be located closer to the first upper cutting edge 15 than the first region 31 and the third region 35.

If the second length L12 at the second region 33, which may be located near the first upper cutting edge 15 subjected to cutting load during the cutting process, is larger than the third length L13, the insert 1 may be less susceptible to positional deviation in the direction orthogonal to the central axis O1 in a top view.

The upper constraining surface 17 may include an upper groove 41 extended from a region located near the front lateral surface 7 toward the rear lateral surface 9. The upper groove 41 may open into the front lateral surface 7 or may be located away from the front lateral surface 7. Similarly, the upper groove 41 may open into the rear lateral surface 9 or may be located away from the rear lateral surface 9.

Figure 2:
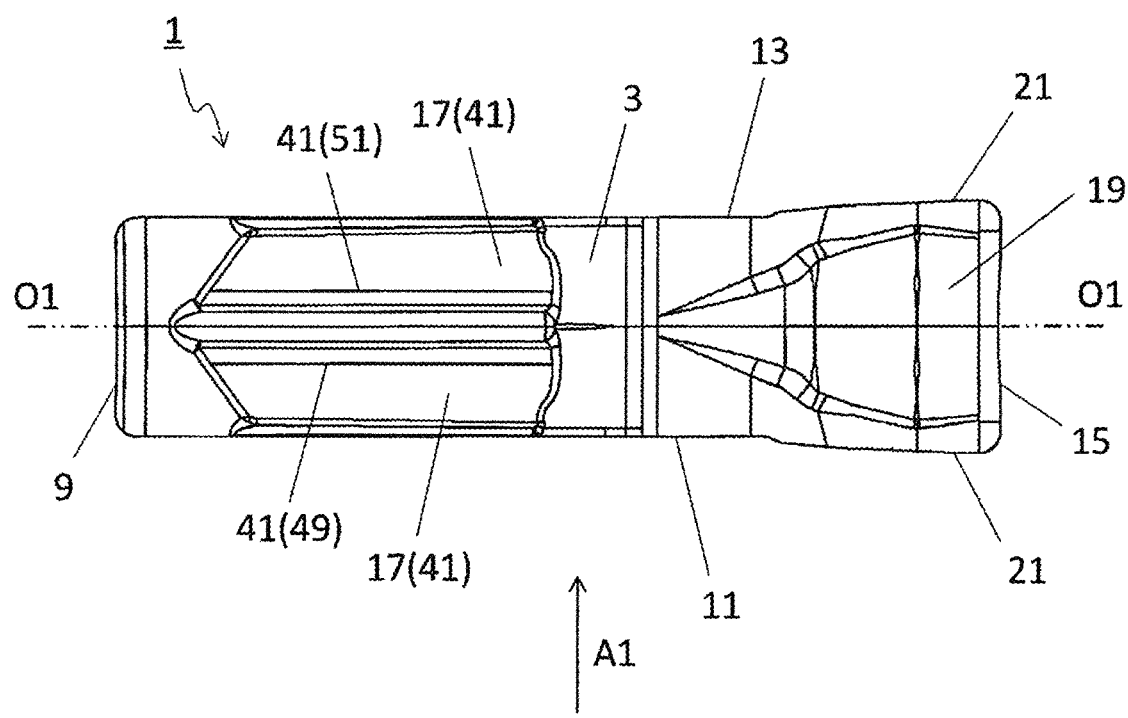
FIG. 2 is a plan view of the cutting insert illustrated in FIG. 1 as viewed from a side of an upper surface.

In other words, the upper groove 41 may be extended parallel to the central axis O1 because the upper groove 41 is extended from a side of the front lateral surface 7 toward a side of the rear lateral surface 9 in the non-limiting embodiment illustrated in FIG. 2. The upper groove 41 may have a V-shape in a cross section orthogonal to an extending direction thereof, namely, a cross section orthogonal to the central axis O1. That is, the upper groove 41 may include a pair of inclined surfaces 53 having a larger distance therebetween as going away from a bottom of the upper groove 41.

If the upper constraining surface 17 includes the upper groove 41, the insert 1 can be stably held by the holder. Particularly, if the upper groove 41 is extended parallel to the lower groove 25, the insert 1 can be further stably held by the holder.

Figure 10:
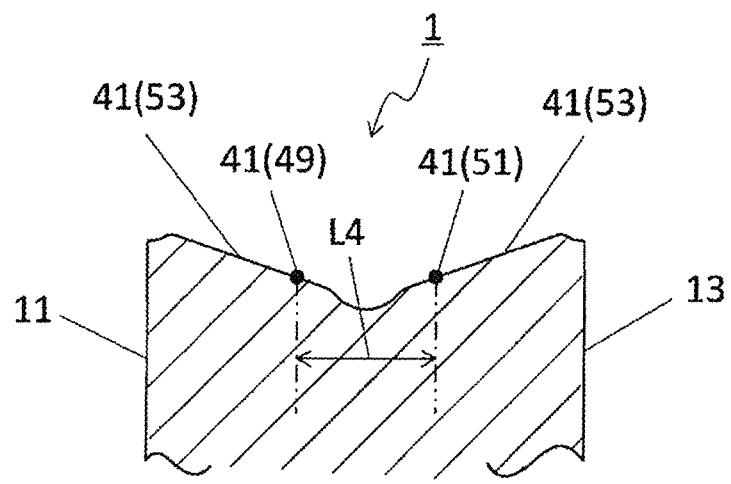
FIG. 10 is a cross-sectional view taken along the line X-X in the cutting insert illustrated in FIG. 6.

As in a non-limiting embodiment illustrated in FIG. 10, the upper groove 41 may include a third portion 49 and a fourth portion 51 which are contactable with the holder. The third portion 49 and the fourth portion 51 may be opposed to each other with a bottom of the upper groove 41 interposed therebetween. A length of a line segment connecting the third portion 49 and the fourth portion 51 in a cross section orthogonal to an extending direction of the upper groove 41 may be a fourth length L4. The first length L11 may be identical with or different from the fourth length L4. If the first length L11 is larger than the fourth length L4, in other words, if the fourth length L4 is smaller than the first length L11, the insert 1 may further have enhanced durability. It may be possible to reduce a probability that a crack occurs from the bottom of the upper groove 41 to the bottom of the lower groove 25.

The insert 1 can be stably held by the holder in cases where a length of a line segment connecting the first portion 45 and the second portion 47 is identical with a length of a line segment connecting the third portion 49 and the fourth portion 51 in at least parts in portions located on opposite sides of the upper groove 41 and the lower groove 25. For example, the third region 35 may include a first site 43 located on a side opposite to the upper constraining surface 17, and the third length L13 at the first site 43 may be identical with the fourth length L4.

As used herein, the term "being identical in length" may denote that these two lengths need not to be strictly identical. If a difference between these two lengths is as small as approximately 0.02 mm, these two lengths may be regarded as being identical with each other.

A length of a line segment connecting two boundaries between the pair of inclined surfaces 27 and the concave curved surface 29 in the first region 31 in a cross section orthogonal to the extending direction of the lower groove 25 may be a fifth length L21. A width of the concave curved surface 29 in the first region 31 may be identical with the fifth length L21 as in a non-limiting embodiment illustrated in FIG. 7.

A length of a line segment connecting two boundaries between the pair of inclined surfaces 27 and the concave curved surface 29 in the second region 33 in the cross section orthogonal to the extending direction of the lower groove 25 may be a sixth length L22. A width of the concave curved surface 29 in the second region 33 may be identical with the sixth length L22 as in a non-limiting embodiment illustrated in FIG. 8.

A length of a line segment connecting two boundaries between the pair of inclined surfaces 27 and the concave curved surface 29 in the third region 35 in the cross section orthogonal to the extending direction of the lower groove 25 may be a seventh length L23. A width of the concave curved surface 29 in the third region 35 may be identical with the seventh length L23 as in a non-limiting embodiment illustrated in FIG. 9.

The fifth length L21 may be identical with or different from each of the sixth length L22 and the seventh length L23. The fifth length L21 may be larger than each of the sixth length L22 and the seventh length L23 as in the non-limiting embodiment illustrated in FIGS. 7 to 9. A large region of the pair of inclined surfaces 27 in the second region 33 and the third region 35 can be ensured if the sixth length L22 and the seventh length L23 are relatively small.

For a period of time during which the region of the pair of inclined surfaces 27 is in contact with the holder, the region may be more excellent in durability against the principal force than the concave curved surface 29. Therefore, even if slight positional deviation occurs in the insert 1 during the cutting process, the principal force exerted on the insert 1 may tend to be stably received by the pair of inclined surfaces 27.

If the fifth length L21 is relatively large, it may be easy to avoid excessive stress concentration at the bottom of the lower groove 25. The bottom of the lower groove 25 may therefore be less susceptible to a crack. Even if a crack occurs in the bottom of the lower groove 25 in the second region 33, the crack may be less likely to propagate up to the third region 35. Similarly, even if a crack occurs in the bottom of the lower groove 25 in the third region 35, the crack may be less likely to propagate up to the second region 33.

Hence, even if a crack occurs in the second region 33 or the third region 35, it may be easy to ensure time allowance until the insert 1 is heavily fractured to thereby cause damage to a machine tool to which a cutting tool is attached. Consequently, even if a crack occurs in the second region 33 or the third region 35, the insert 1 may be replaceable with time to spare.

A radius of curvature of the concave curved surface 29 in the first region 31 may be larger than a radius of curvature of the concave curved surface 29 in the second region 33 and the third region 35 in a cross section orthogonal to the extending direction of the lower groove 25. In this case, the excessive stress concentration may be much less likely to occur at the bottom of the lower groove 25. In the above configuration, a comparison may be made between radii of curvature in the first region 31, the second region 33 and the third region 35 on the bottom of the lower groove 25.

The concave curved surface 29 connecting the pair of inclined surfaces 27 may be located on the bottom of the lower groove 25 as described above. For example, a bottom having a concave curved surface shape in the first region 31 may be a first bottom part 29a, and the pair of inclined surfaces 27 in the first region 31 may be the first inclined surfaces 27a. That is, the first region 31 may include the first bottom part 29a having the concave curved surface shape, and the first inclined surfaces 27a that are flat and connect to the first bottom part 29a along the extending direction of the lower groove 25.

A width of the first bottom part 29a in the extending direction of the lower groove 25 may be a first width W1, and a width of each of the first inclined surfaces 27a in the extending direction of the lower groove 25 may be a second width W2. A maximum value of the first width W1 may be smaller than a maximum value of the second width W2. In this case, the insert 1 may be much less susceptible to positional deviation in the direction orthogonal to the central axis O1 in a top view.

For example, a bottom having a concave curved surface shape in the second region 33 may be a second bottom part 29b, and a pair of inclined surfaces 27 in the second region 33 may be second inclined surfaces 27b. That is, the second region 33 may include the second bottom part 29b having the concave curved surface shape, and the second inclined surfaces 27b that are flat and connect to the second bottom part 29b along the extending direction of the lower groove 25.

A width of the second bottom part 29b in the extending direction of the lower groove 25 may be a third width W3, and a width of each of the second inclined surfaces 27b in the extending direction of the lower groove 25 may be a fourth width W4. A maximum value of the third width W3 may be larger than a maximum value of the fourth width W4. In this case, the second region 33 may have enhanced durability.

For example, inorganic materials, such as cemented carbide, cermet and ceramics, may be usable as a material of the insert 1. Examples of composition of the cemented carbide may include WC(tungsten carbide)-Co, WC—TiC(titanium carbide)-Co and WC—TiC—TaC(tantalum carbide)-Co, in which WC, TiC and TaC may be hard particles and Co may be a binding phase.

The cermet may be a sintered composite material obtainable by compositing metal into a ceramic component. Examples of the cermet may include compounds composed mainly of TiC or TiN(titanium nitride). Of course, it should be clear that the material of the insert 1 is not limited to these materials.

Alternatively, though not particularly illustrated, the insert 1 may be configured to include a base (substrate) including the above material, and a coating layer to cover the base. Examples of material of the coating layer may include carbides, nitrides, oxides, oxocarbons, nitrogen oxides, carbonitrides and carboxynitrides of titanium.

The coating layer may include one or a plurality of the above materials. The coating layer may be formed by one layer or a plurality of layers laminated one upon another. The material of the coating layer is not limited to the above materials.

The coating layer may be located on the base by using chemical vapor deposition (CVD) method or physical vapor deposition (PVD) method.

<Cutting Tools>

Cutting tools 101 in non-limiting embodiments of the present disclosure may be described below with reference to the drawings.

The cutting tool 101 of one of the non-limiting embodiments may include a holder 103 and an insert 1. The holder 103 may have a bar shape. Alternatively, the holder 103 may have a plate shape extended from a first end (lower right end in FIG. 11) to a second end (upper left end in FIG. 11) as in a non-limiting embodiment illustrated in FIG. 11.

Figure 12:
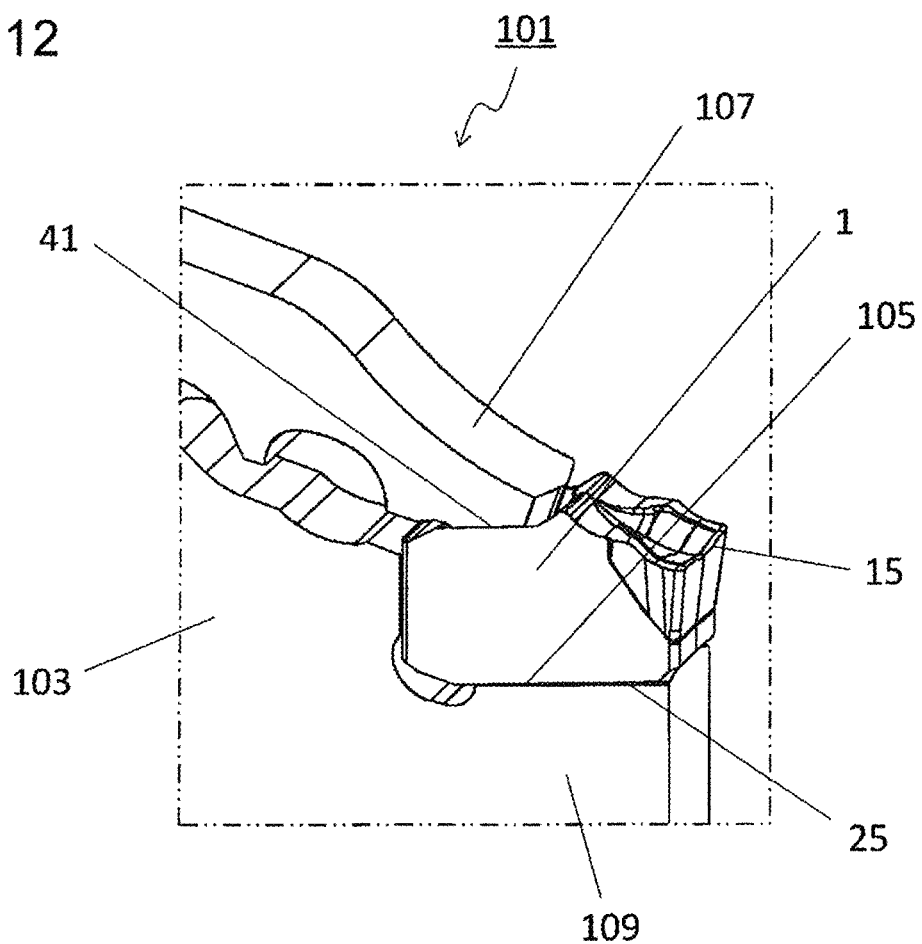
FIG. 12 is an enlarged view of a region B1 illustrated in FIG. 11.

The holder 103 may include a pocket 105 located on a side of the first end. As in a non-limiting embodiment illustrated in FIG. 12, the holder 103 may include an upper jaw 107 and a lower jaw 109 which are located on a side of the first end and are located away from each other. The pocket 105 may be formed by the upper jaw 107 and the lower jaw 109.

The insert 1 may be located in the pocket 105. In other words, the insert 1 may be interposed between the upper jaw 107 and the lower jaw 109. The insert 1 may be attached so that at least a part of a region used as a cutting edge is protruded outward from the holder 103.

For example, steel and cast iron may be used as a material of the holder 103. Of these materials, the use of steel particularly may contribute to enhancing toughness of the holder 103.

Figure 11:
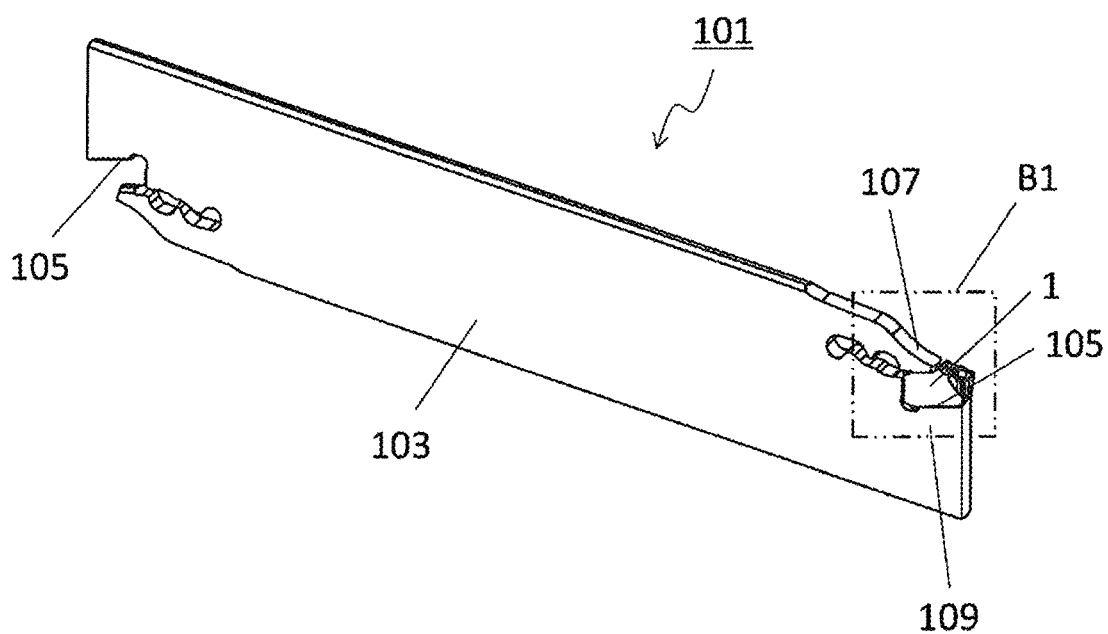
FIG. 11 is a perspective view illustrating a cutting tool in a non-limiting embodiment of the present disclosure.

The cutting tool 101 for use in a so-called turning process may be illustrated in the non-limiting embodiment illustrated in FIG. 11. The cutting tools 101 in the non-limiting embodiments of the present disclosure may be usable for a grooving process, but the use thereof is not limited thereto. There is no problem even if the cutting tools 101 in the non-limiting embodiments are used for inner diameter process, outer diameter process and traversing process.

<Methods for Manufacturing Machined Product>

Methods for manufacturing a machined product 201 in non-limiting embodiments of the present disclosure may be described below with reference to the drawings.

The machined product 201 may be manufacturable by carrying out a cutting process of a workpiece 203. The methods for manufacturing the machined product 201 in the non-limiting embodiments may include the following steps:

(1) rotating the workpiece 203;

(2) bringing the cutting tool 101 represented by the above non-limiting embodiments into contact with the workpiece 203 being rotated; and (3) moving the cutting tool 101 away from the workpiece 203.

Figure 13:
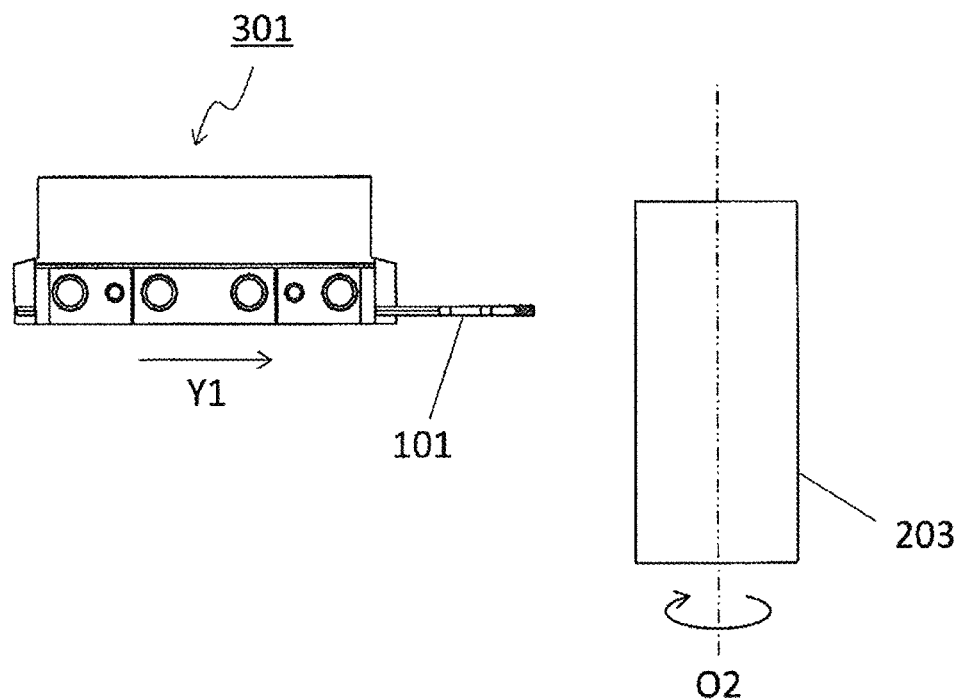
FIG. 13 is a schematic diagram illustrating one of steps in a method for manufacturing a machined product in a non-limiting embodiment of the present disclosure.
Figure 14:
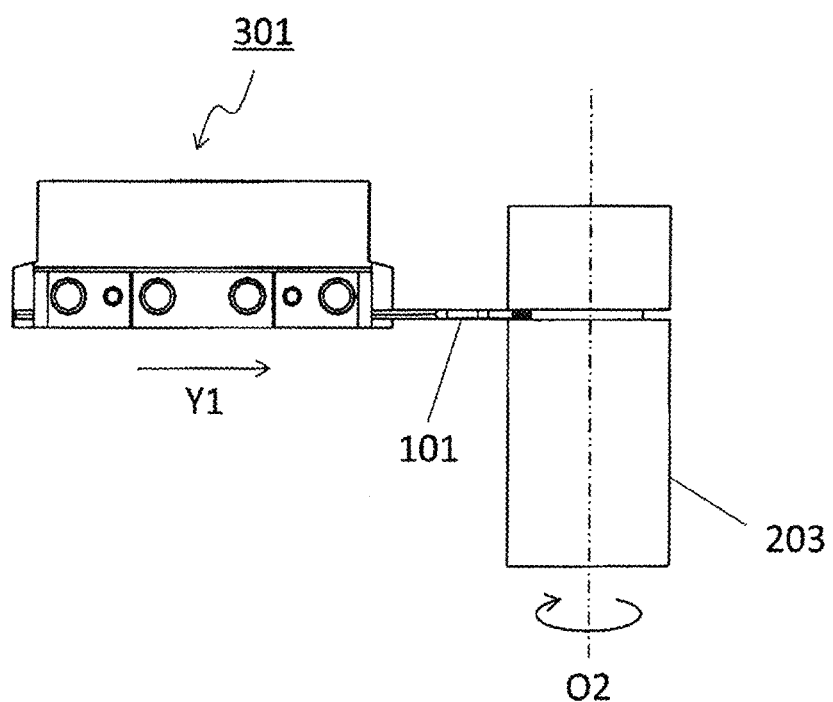
FIG. 14 is a schematic diagram illustrating one of the steps in the method for manufacturing a machined product in the non-limiting embodiment of the present disclosure.
Figure 15:
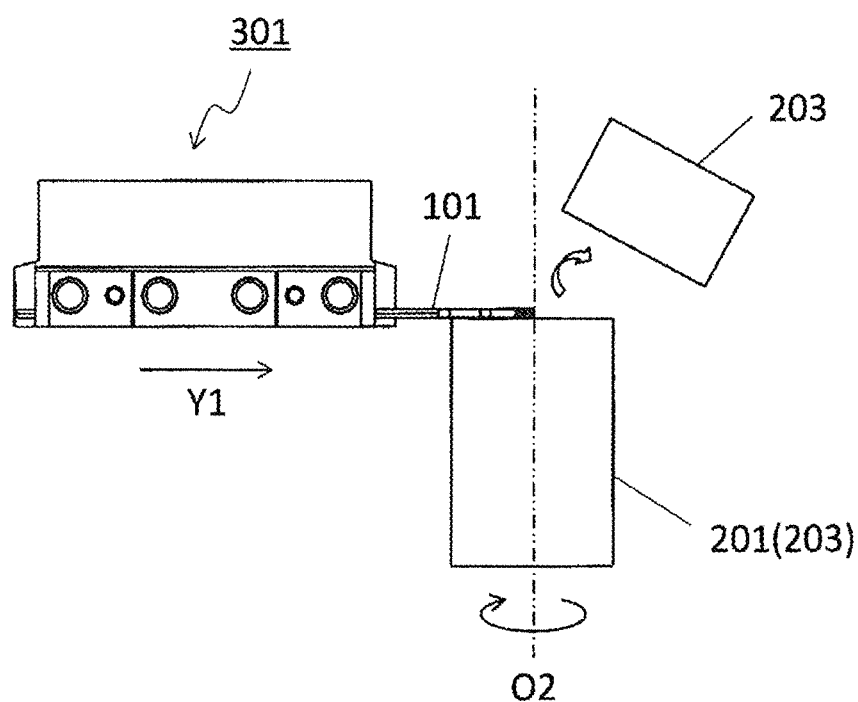
FIG. 15 is a schematic diagram illustrating one of the steps in the method for manufacturing a machined product in the non-limiting embodiment of the present disclosure.

More specifically, firstly, the workpiece 203 may be rotated around an axis O2 as in the non-limiting embodiment illustrated in FIG. 13, and the cutting tool 101 attached to a machine tool 301 may be relatively brought near the workpiece 203. Subsequently, the workpiece 203 may be cut out by bringing a ridgeline (cutting edge) in the cutting tool 101 into contact with the workpiece 203 as in the non-limiting embodiment illustrated in FIGS. 14 and 15. Thereafter, the cutting tool 101 may be relatively moved away from the workpiece 203 as in the non-limiting embodiment illustrated in FIG. 16.

In the non-limiting embodiment illustrated in FIG. 13, the cutting tool 101 may be brought near the workpiece 203 by moving the cutting tool 101 in a Y1 direction in a state where the axis O2 is fixed and the workpiece 203 is rotated around the axis O2. In the non-limiting embodiment illustrated in FIGS. 14 and 15, the workpiece 203 may be cut out by bringing the cutting edge (the first upper cutting edge 15) in the insert 1 into contact with the workpiece 203 being rotated. In FIG. 16, the cutting tool 101 may be moved away by moving the cutting tool 101 in a Y2 direction in a state where the workpiece 203 is rotated.

In the cutting process with the manufacturing method in the non-limiting embodiments, the cutting tool 101 may be brought into contact with the workpiece 203, or the cutting tool 101 may be moved away from the workpiece 203 by moving the cutting tool 101 in the individual steps. However, it is not intended to limit to this embodiment.

For example, the workpiece 203 may be brought near the cutting tool 101 in the step (1). Similarly, the workpiece 203 may be moved away from the cutting tool 101 in the step (3). If it is desired to continue the cutting process, the step of bringing the cutting edge in the insert 1 into contact with different portions of the workpiece 203 may be repeated while keeping the workpiece 203 rotated.

Representative examples of material of the workpiece 203 may include carbon steel, alloy steel, stainless steel, cast iron or nonferrous metals.

The invention claimed is:

1. A cutting insert, comprising:
an upper surface;
a lower surface located on a side opposite to the upper surface;
a front lateral surface located between the upper surface and the lower surface;
a rear lateral surface located between the upper surface and the lower surface and located on a side opposite to the front lateral surface;
a first lateral surface located between the upper surface and the lower surface and located between the front lateral surface and the rear lateral surface; and
a second lateral surface located between the upper surface and the lower surface, located between the front lateral surface and the rear lateral surface, and located on a side opposite to the first lateral surface,
the upper surface comprising
a first upper cutting edge located on an intersection with the front lateral surface, and
an upper constraining surface which is located closer to the rear lateral surface than the first upper cutting edge, and which is contactable with a holder,
the lower surface comprising a lower constraining surface contactable with the holder,
the lower constraining surface comprising a lower groove having a V-shape extended from a side of the front lateral surface toward the rear lateral surface,
the lower groove comprising
a first region located on a side opposite to the upper constraining surface,
a second region located closer to the front lateral surface than the first region, and
a third region located closer to the rear lateral surface than the first region,
the lower groove further comprising a first portion and a second portion which are opposed to each other with a bottom of the lower groove interposed therebetween, and which are contactable with the holder, wherein
the first portion is closer to the first lateral surface than the bottom of the lower groove and comprises a first outer edge extending along the first lateral surface,
the second portion is closer to the second lateral surface than the bottom of the lower groove and comprises a second outer edge extending along the second lateral surface,
a length of a line segment connecting the first outer edge and the second outer edge in the first region is a first length, a length of a line segment connecting the first outer edge and the second outer edge in the second region is a second length, and a length of a line segment connecting the first outer edge and the second outer edge in the third region is a third length in a cross section orthogonal to an extending direction of the lower groove,
the first length is larger than each of the second length and the third length,
the upper constraining surface comprises an upper groove having a V-shape extended from a side of the front lateral surface toward the rear lateral surface,
the upper groove is extended parallel to the lower groove,
the upper groove comprises a third portion and a fourth portion which are opposed to each other with a bottom of the upper groove interposed therebetween, and which are contactable with the holder,
the third portion is closer to the first lateral surface than the bottom of the upper groove and comprises a third outer edge extending along the first lateral surface,
the fourth portion is closer to the second lateral surface than the bottom of the upper groove and comprises a fourth outer edge extending along the second lateral surface,
a length of a line segment connecting the third outer edge and the fourth outer edge is a fourth length in a cross section orthogonal to an extending direction of the upper groove, and
the first length is larger than the fourth length.

2. The cutting insert according to claim 1, wherein the second length is larger than the third length.

3. The cutting insert according to claim 1, wherein
the third region comprises a first site located on a side opposite to the upper constraining surface, and
the third length at the first site is identical with the fourth length.

4. The cutting insert according to claim 1, wherein
the first region comprises
a first bottom part having a concave curved surface shape, and
a first inclined surface that is flat and connects to the first bottom part along the extending direction of the lower groove,
a width of the first bottom part in the extending direction of the lower groove is a first width, and a width of the first inclined surface in the extending direction of the lower groove is a second width, and
a maximum value of the first width is smaller than a maximum value of the second width.

5. The cutting insert according to claim 1, wherein
the second region comprises
a second bottom part having a concave curved surface shape, and
a second inclined surface that is flat and connects to the second bottom part along the extending direction of the lower groove,
a width of the second bottom part in the extending direction of the lower groove is a third width, and a width of the second inclined surface in the extending direction of the lower groove is a fourth width, and
a maximum value of the third width is larger than a maximum value of the fourth width.

6. A cutting tool, comprising:
a holder which has a plate shape extended from a first end to a second end and comprises a pocket located on a side of the first end; and
a cutting insert being located in the pocket,
the cutting insert comprising:
an upper surface;
a lower surface located on a side opposite to the upper surface;
a front lateral surface located between the upper surface and the lower surface;
a rear lateral surface located between the upper surface and the lower surface and located on a side opposite to the front lateral surface;
a first lateral surface located between the upper surface and the lower surface and located between the front lateral surface and the rear lateral surface; and
a second lateral surface located between the upper surface and the lower surface, located between the front lateral surface and the rear lateral surface, and located on a side opposite to the first lateral surface, the upper surface comprising
a first upper cutting edge located on an intersection with the front lateral surface, and
an upper constraining surface which is located closer to the rear lateral surface than the first upper cutting edge, and which contacts the holder,
the lower surface comprising a lower constraining surface contacting the holder,
the lower constraining surface comprising a lower groove having a V-shape extended from a side of the front lateral surface toward the rear lateral surface,
the lower groove comprising
a first region located on a side opposite to the upper constraining surface,
a second region located closer to the front lateral surface than the first region, and
a third region located closer to the rear lateral surface than the first region,
the lower groove further comprising a first portion and a second portion which are opposed to each other with a bottom of the lower groove interposed therebetween, and which contact the holder, wherein
the first portion is closer to the first lateral surface than the bottom of the lower groove and comprises a first outer edge extending along the first lateral surface,
the second portion is closer to the second lateral surface than the bottom of the lower groove and comprises a second outer edge extending along the second lateral surface,
a length of a line segment connecting the first outer edge and the second outer edge in the first region is a first length, a length of a line segment connecting the first outer edge and the second outer edge in the second region is a second length, and a length of a line segment connecting the first outer edge and the second outer edge in the third region is a third length in a cross section orthogonal to an extending direction of the lower groove,
the first length is larger than each of the second length and the third length,
the upper constraining surface comprises an upper groove having a V-shape extended from a side of the front lateral surface toward the rear lateral surface,
the upper groove is extended parallel to the lower groove,
the upper groove comprises a third portion and a fourth portion which are opposed to each other with a bottom of the upper groove interposed therebetween, and which are contactable with the holder,
the third portion is closer to the first lateral surface than the bottom of the upper groove and comprises a third outer edge extending along the first lateral surface,
the fourth portion is closer to the second lateral surface than the bottom of the upper groove and comprises a fourth outer edge extending along the second lateral surface,
a length of a line segment connecting the third outer edge and the fourth outer edge is a fourth length in a cross section orthogonal to an extending direction of the upper groove, and
the first length is larger than the fourth length.

7. A method for manufacturing a machined product, comprising:
rotating a workpiece;
bringing a cutting tool into contact with the workpiece being rotated; and
moving the cutting tool away from the workpiece, wherein the cutting tool comprises:

a holder which has a plate shape extended from a first end to a second end and comprises a pocket located on a side of the first end; and
a cutting insert being located in the pocket, the cutting insert comprising:
an upper surface;
a lower surface located on a side opposite to the upper surface;
a front lateral surface located between the upper surface and the lower surface;
a rear lateral surface located between the upper surface and the lower surface and located on a side opposite to the front lateral surface;
a first lateral surface located between the upper surface and the lower surface and located between the front lateral surface and the rear lateral surface; and
a second lateral surface located between the upper surface and the lower surface, located between the front lateral surface and the rear lateral surface, and located on a side opposite to the first lateral surface,
the upper surface comprising
a first upper cutting edge located on an intersection with the front lateral surface, and
an upper constraining surface which is located closer to the rear lateral surface than the first upper cutting edge, and which contacts the holder,
the lower surface comprising a lower constraining surface contacting the holder,
the lower constraining surface comprising a lower groove having a V-shape extended from a side of the front lateral surface toward the rear lateral surface,
the lower groove comprising
a first region located on a side opposite to the upper constraining surface,
a second region located closer to the front lateral surface than the first region, and
a third region located closer to the rear lateral surface than the first region,
the lower groove further comprising a first portion and a second portion which are opposed to each other with a bottom of the lower groove interposed therebetween, and which contact the holder, wherein
the first portion is closer to the first lateral surface than the bottom of the lower groove and comprises a first outer edge extending along the first lateral surface,
the second portion is closer to the second lateral surface than the bottom of the lower groove and comprises a second outer edge extending along the second lateral surface,
a length of a line segment connecting the first outer edge and the second outer edge in the first region is a first length, a length of a line segment connecting the first outer edge and the second outer edge in the second region is a second length, and a length of a line segment connecting the first outer edge and the second outer edge in the third region is a third length in a cross section orthogonal to an extending direction of the lower groove,
the first length is larger than each of the second length and the third length, the upper constraining surface comprises an upper groove having a V-shape extended from a side of the front lateral surface toward the rear lateral surface, the upper groove is extended parallel to the lower groove, the upper groove comprises a third portion and a fourth portion which are opposed to each other with a bottom of the upper groove interposed therebetween, and which are contactable with the holder, the third portion is closer to the first lateral surface than the bottom of the upper groove and comprises a third outer edge extending along the first lateral surface, the fourth portion is closer to the second lateral surface than the bottom of the upper groove and comprises a fourth outer edge extending along the second lateral surface, a length of a line segment connecting the third outer edge and the fourth outer edge is a fourth length in a cross section orthogonal to an extending direction of the upper groove, and the first length is larger than the fourth length.

8. A cutting insert, comprising:

an upper surface;

a lower surface located on a side opposite to the upper surface;

a front lateral surface located between the upper surface and the lower surface;

a rear lateral surface located between the upper surface and the lower surface and located on a side opposite to the front lateral surface;

a first lateral surface located between the upper surface and the lower surface and located between the front lateral surface and the rear lateral surface; and a second lateral surface located between the upper surface and the lower surface, located between the front lateral surface and the rear lateral surface, and located on a side opposite to the first lateral surface, the upper surface comprising
   a first upper cutting edge located on an intersection with the front lateral surface, and
   an upper constraining surface which is located closer to the rear lateral surface than the first upper cutting edge, and which is contactable with a holder, the lower surface comprising a lower constraining surface contactable with the holder, the lower constraining surface comprising a lower groove having a V-shape extended from a side of the front lateral surface toward the rear lateral surface, the lower groove comprising
   a first region located on a side opposite to the upper constraining surface,
   a second region located closer to the front lateral surface than the first region, and
   a third region located closer to the rear lateral surface than the first region, the lower groove further comprising a first portion and a second portion which are opposed to each other with a bottom of the lower groove interposed therebetween, and which are contactable with the holder, wherein the first portion is closer to the first lateral surface than the bottom of the lower groove and comprises a first outer edge extending along the first lateral surface, the second portion is closer to the second lateral surface than the bottom of the lower groove and comprises a second outer edge extending along the second lateral surface, a length of a line segment connecting the first outer edge and the second outer edge in the first region is a first length, a length of a line segment connecting the first outer edge and the second outer edge in the second region is a second length, and a length of a line segment connecting the first outer edge and the second outer edge in the third region is a third length in a cross section orthogonal to an extending direction of the lower groove, the first length is larger than each of the second length and the third length, the first region comprises
   a first bottom part having a concave curved surface shape, and
   a first inclined surface that is flat and connects to the first bottom part along the extending direction of the lower groove, a width of the first bottom part in the extending direction of the lower groove is a first width, and a width of the first inclined surface in the extending direction of the lower groove is a second width, and a maximum value of the first width is smaller than a maximum value of the second width.

9. The cutting insert according to claim 8, wherein the second length is larger than the third length.

10. The cutting insert according to claim 8, wherein the second region comprises
   a second bottom part having a concave curved surface shape, and
   a second inclined surface that is flat and connects to the second bottom part along the extending direction of the lower groove, a width of the second bottom part in the extending direction of the lower groove is a third width, and a width of the second inclined surface in the extending direction of the lower groove is a fourth width, and a maximum value of the third width is larger than a maximum value of the fourth width.

11. A cutting insert, comprising:

an upper surface;

a lower surface located on a side opposite to the upper surface;

a front lateral surface located between the upper surface and the lower surface;

a rear lateral surface located between the upper surface and the lower surface and located on a side opposite to the front lateral surface;

a first lateral surface located between the upper surface and the lower surface and located between the front lateral surface and the rear lateral surface; and a second lateral surface located between the upper surface and the lower surface, located between the front lateral surface and the rear lateral surface and located on a side opposite to the first lateral surface, the upper surface comprising
   a first upper cutting edge located on an intersection with the front lateral surface, and
   an upper constraining surface which is located closer to the rear lateral surface than the first upper cutting edge, and which is contactable with a holder, the lower surface comprising a lower constraining surface contactable with the holder, the lower constraining surface comprising a lower groove having a V-shape extended from a side of the front lateral surface toward the rear lateral surface, the lower groove comprising
   a first region located on a side opposite to the upper constraining surface, a second region located closer to the front lateral surface than the first region, and
a third region located closer to the rear lateral surface than the first region,
the lower groove further comprising a first portion and a second portion which are opposed to each other with a bottom of the lower groove interposed therebetween, and which are contactable with the holder, wherein
the first portion is closer to the first lateral surface than the bottom of the lower groove and comprises
a first outer edge extending along the first lateral surface and
a first inner edge extending along the bottom of the lower groove,
the second portion is closer to the second lateral surface than the bottom of the lower groove and comprises
a second outer edge extending along the second lateral surface and
a second inner edge extending along the bottom of the lower groove,
a length of a line segment connecting the first outer edge and the second outer edge in the first region is a first length, a length of a line segment connecting the first outer edge and the second outer edge in the second region is a second length, a length of a line segment connecting the first outer edge and the second outer edge in the third region is a third length, a length of a line segment connecting the first inner edge and the second inner edge in the first region is a fifth length, a length of a line segment connecting the first inner edge and the second inner edge in the second region is a sixth length, and a length of a line segment connecting the first inner edge and the second inner edge in the third region is a seventh length in a cross section orthogonal to an extending direction of the lower groove,
the first length is larger than each of the second length and the third length, and
the fifth length is larger than each of the sixth length and the seventh length.

12. The cutting insert according to claim 11, wherein the second length is larger than the third length.

13. The cutting insert according to claim 11, wherein the second region comprises
a second bottom part having a concave curved surface shape, and
a second inclined surface that is flat and connects to the second bottom part along the extending direction of the lower groove,
a width of the second bottom part in the extending direction of the lower groove is a third width, and a width of the second inclined surface in the extending direction of the lower groove is a fourth width, and
a maximum value of the third width is larger than a maximum value of the fourth width.

* * * * *